(12) United States Patent
Wu et al.

(10) Patent No.: US 11,296,394 B2
(45) Date of Patent: Apr. 5, 2022

(54) FLEXIBLE ANTENNA BELTS

(71) Applicant: HEWLETT-PACKARD DEVELOPMENT COMPANY, L.P., Spring, TX (US)

(72) Inventors: Kuan-Ting Wu, Taipei (TW); Wei-Chung Chen, Taipei (TW); Shih Huang Wu, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/760,998

(22) PCT Filed: Dec. 8, 2017

(86) PCT No.: PCT/US2017/065330
§ 371 (c)(1),
(2) Date: May 1, 2020

(87) PCT Pub. No.: WO2019/112608
PCT Pub. Date: Jun. 13, 2019

(65) Prior Publication Data
US 2020/0313274 A1  Oct. 1, 2020

(51) Int. Cl.
*H01Q 1/08* (2006.01)
*H01Q 1/42* (2006.01)
*H01Q 1/22* (2006.01)
*G06F 1/16* (2006.01)

(52) U.S. Cl.
CPC .......... *H01Q 1/085* (2013.01); *G06F 1/1652* (2013.01); *H01Q 1/42* (2013.01); *H01Q 1/2266* (2013.01)

(58) Field of Classification Search
CPC .......... H01Q 1/085; H01Q 1/12; H01Q 1/125; H01Q 1/1264; H01Q 1/20; H01Q 1/22; H01Q 1/2258; H01Q 1/2266; H01Q 1/42; G06F 1/1652
See application file for complete search history.

(56) References Cited

U.S. PATENT DOCUMENTS

| | | | |
|---|---|---|---|
| 6,414,643 B2 * | 7/2002 | Cheng | G06F 1/1616 343/702 |
| 7,847,753 B2 | 12/2010 | Ishibashi et al. | |
| 9,155,183 B2 | 10/2015 | Voronin et al. | |
| 9,450,292 B2 * | 9/2016 | Irci | H01Q 1/38 |
| 9,660,344 B2 | 5/2017 | Pan et al. | |
| 9,964,995 B1 * | 5/2018 | Morrison | G06F 1/1622 |

(Continued)

FOREIGN PATENT DOCUMENTS

| | | |
|---|---|---|
| CN | 1416222 | 5/2003 |
| CN | 106453701 | 2/2017 |

(Continued)

OTHER PUBLICATIONS

Peter, T. "A Novel Tranpatent TSA for Laptop and UWB Appications", Mar. 27-30, 2012.

*Primary Examiner* — Jason Crawford
(74) *Attorney, Agent, or Firm* — Brooks, Cameron & Huebsch PLLC

(57) ABSTRACT

Examples described herein relate to flexible antenna belts. For instance, a system may comprise a flexible antenna belt, where the flexible antenna belt is to transition between a closed position and an open position, and a flexible display coupled to the flexible antenna belt.

15 Claims, 8 Drawing Sheets

(56) References Cited

U.S. PATENT DOCUMENTS

| | | | |
|---|---|---|---|
| 10,181,648 B2* | 1/2019 | Liu | H01Q 9/14 |
| 2006/0209218 A1 | 9/2006 | Lee | |
| 2009/0251373 A1* | 10/2009 | Degner | H01R 13/6205 |
| | | | 343/702 |
| 2010/0073243 A1* | 3/2010 | Ayala Vazquez | H01Q 1/02 |
| | | | 343/702 |
| 2010/0321253 A1* | 12/2010 | Ayala Vazquez | H01Q 1/2258 |
| | | | 343/702 |
| 2010/0328171 A1 | 12/2010 | Mak et al. | |
| 2011/0267238 A1 | 11/2011 | Nekozuka | |
| 2012/0068893 A1* | 3/2012 | Guterman | H01Q 5/378 |
| | | | 343/702 |
| 2013/0222613 A1* | 8/2013 | Yehezkely | G06F 3/005 |
| | | | 348/207.1 |
| 2013/0241795 A1* | 9/2013 | Sung | H01Q 1/273 |
| | | | 343/861 |
| 2013/0262298 A1* | 10/2013 | Morley | G06Q 20/325 |
| | | | 705/39 |
| 2013/0321216 A1* | 12/2013 | Jervis | H04M 1/0216 |
| | | | 343/702 |
| 2014/0055924 A1 | 2/2014 | Baek | |
| 2017/0005403 A1 | 1/2017 | Lam et al. | |
| 2017/0031388 A1 | 2/2017 | Han | |
| 2017/0150616 A1 | 5/2017 | Li | |
| 2017/0344105 A1 | 11/2017 | Mullen | |
| 2019/0131688 A1* | 5/2019 | Ramasamy | G06F 1/1683 |
| 2019/0356051 A1* | 11/2019 | Barrera | H01Q 21/28 |
| 2020/0313274 A1* | 10/2020 | Wu | H01Q 1/1264 |
| 2021/0104582 A1* | 4/2021 | Kim | H01Q 1/243 |

FOREIGN PATENT DOCUMENTS

| | | |
|---|---|---|
| KR | 100818170 | 4/2008 |
| WO | WO-2013154713 A1 | 10/2013 |
| WO | WO-2017023306 A1 | 2/2017 |
| WO | WO-2017094966 | 6/2017 |

* cited by examiner

FLEXIBLE ANTENNA BELTS

BACKGROUND

Antennas may be utilized to couple computing devices to wireless networks. Examples of computing devices may include, but are not limited to, mobile phones, smart phones, tablet computers, and notebook computers, among others. Computing devices may include transmitters and receivers for wireless communication. The transmitters and receivers may be connected to an antenna for transmitting and/or receiving wireless signals. The transmitters and receivers may enable the computing device to wirelessly communicate with a network.

DETAILED DESCRIPTION

Computing devices including, but not limited to, mobile phones, smart phones, tablet computers, and notebook computers may transmit and receive data through wireless signals via an antenna. In some examples, an antenna may experience interference and/or may not perform as expected when positioned near and/or in contact with another antenna. In some examples, computing devices such as mobile phones, smart phones, tablet computers, notebook computers, etc. may include conductive substrates such as metals, carbon fiber composites, etc. However, the conductive substrates may cause signal interference with the computing device's antenna system. As such, examples described herein, may include a flexible antenna belt to reduce signal interference with the computing device's antenna system.

Figure 1:
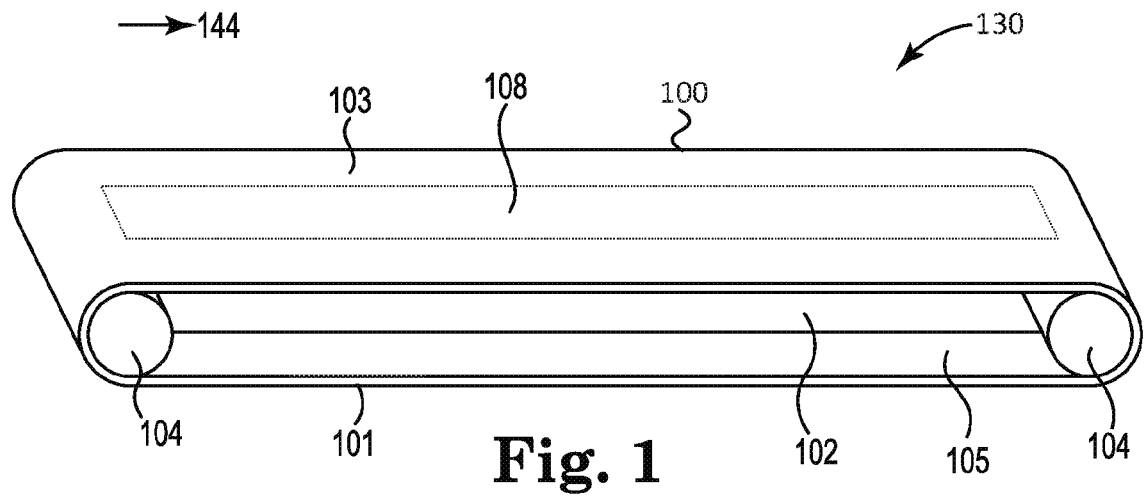
FIG. 1 illustrates an example system for a flexible antenna belt according to the disclosure.

FIG. 1 illustrates an example system 130 for a flexible antenna belt 100 according to the disclosure. The system 130 may be implemented in a variety of computing devices, such as mobile phones, smart phones, tablet computers, and notebook computers, for example. In some examples, the system 130 may be implemented in a notebook computer. In some examples, the system 130 may be implemented in a tablet computer. In some examples, system 130 may include a flexible antenna belt 100. In some examples, the flexible antenna belt 100 may be comprised of a non-impact antenna radiation flexible material. In some examples, the non-impact antenna radiation flexible material may be comprised of polytetrafluoroethylene (PTFE) coated aramid synthetic fibers. In some examples, the PTFE coated aramid synthetic fibers may have a tensile strength of up to 3,600 megapascals (Mpa) and a breaking strength of 338 Newtons (N).

In various examples, the flexible antenna belt 100 may include a first side 101. In various examples, the flexible antenna belt 100 may include a second side 103 opposite the first side 101. In some examples, the flexible display 108 may be coupled to either of the first side 101 of the flexible antenna belt 100 or the second side 103 of the flexible antenna belt 100. In some examples, the flexible display 108 may be comprised of organic light emitting diode (OLED), electrophoretic display (EPD), liquid crystal display (LCD), organic LCD, cholesteric LCD, micro-electro-mechanical systems (MEMS), or combinations thereof.

In some examples, the flexible antenna belt 100 may include an antenna slot 102. In various examples, the antenna slot 102 may be an opening extending through the flexible antenna belt 100. In some examples, the antenna slot 102 may be an opening extending through the first side 101 of the flexible antenna belt 100 or the second side 103 of the flexible antenna belt 100 that is opposite the flexible display 108. In some examples, the antenna slot 102 may be an opening that encompasses 10% to 95% of the first side 101 of the flexible antenna belt 100 or the second side 103 of the flexible antenna belt 100 that is opposite the flexible display 108. However, the disclosure is not so limited. For example, the antenna slot 102 may be an opening that encompasses a portion of the first side 101 or a portion the second side 103 enough to allow wireless signals and antenna radiation to pass through. Further, in some examples, the flexible antenna belt 100 may be slot-free (i.e., may not include an antenna slot).

As illustrated in FIG. 1, the flexible antenna belt 100 may form a continuous loop 105. In some examples, the flexible antenna belt 100 may include two rollers 104. In some examples, the rollers 104 may be disposed inside the continuous loop 105 of the flexible antenna belt 100. In some examples, the rollers 104 may be disposed inside the continuous loop 105 of the flexible antenna belt 100 perpendicular to the continuous loop 105 opening. In some examples, the rollers 104 may rotate the flexible antenna belt 100 in a direction, along the axis, as denoted by the arrow 144. However, the disclosure is not so limited. In some examples, the flexible antenna belt 100 may include more or less rollers 104. For example, the flexible antenna belt 100 may include four rollers disposed inside the continuous loop 105 of the flexible antenna belt 100.

Figure 2:
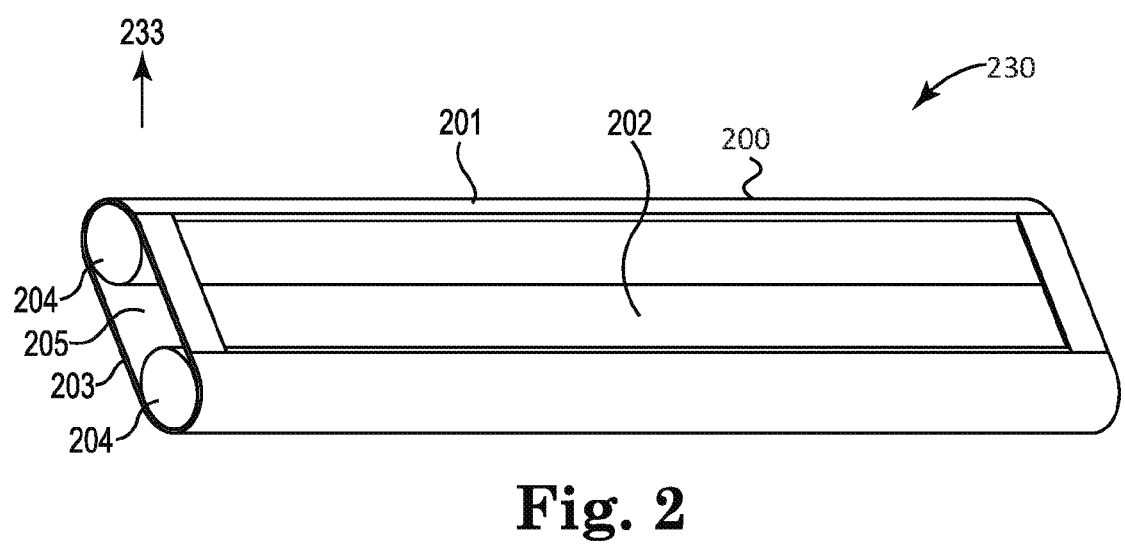
FIG. 2 illustrates an example system for a flexible antenna belt according to the disclosure.

FIG. 2 illustrates an example system 230 for a flexible antenna belt 200 according to the disclosure. In some examples, system 230 may include a flexible antenna belt 200. In various examples, the flexible antenna belt 200 may include a first side 201. In various examples, the flexible antenna belt 200 may include a second side 203 opposite the first side 201. In some examples, the flexible antenna belt 200 may form a continuous loop 205. In some examples, the flexible antenna belt 200 may be comprised of a non-impact antenna radiation flexible material.

In various examples, the flexible antenna belt 200 may include an antenna slot 202. In various examples, the antenna slot 202 may be an opening extending through the flexible antenna belt 200. In some examples, the antenna slot 202 may be an opening extending through the first side 201 or the second side 203 of the flexible antenna belt 200 that is opposite the flexible display (see, e.g., 108 of FIG. 1).

As illustrated in FIG. 2, the flexible antenna belt 200 may include two rollers 204. In some examples, the rollers 204 may be disposed inside the continuous loop 205 of the flexible antenna belt 200. In some examples, the rollers 204 may be disposed inside the continuous loop 205 of the flexible antenna belt 200 perpendicular to the continuous loop 205 opening. In some examples, the rollers 204 may rotate the flexible antenna belt 200 in a direction, along the axis, as denoted by the arrow 233.

Figure 3:
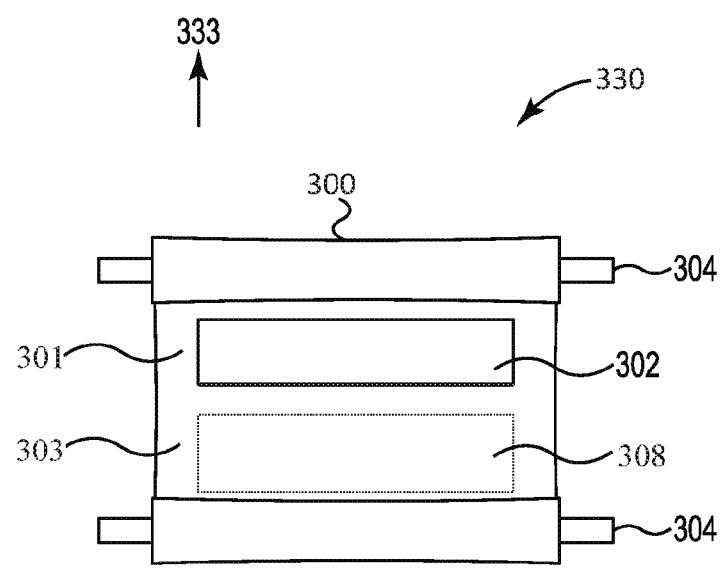
FIG. 3 illustrates an example system for a flexible antenna belt according to the disclosure.

FIG. 3 illustrates an example system 330 for a flexible antenna belt 300 according to the disclosure. In some examples, system 330 may include a flexible antenna belt 300. In various examples, the flexible antenna belt 300 may include a first side 301. In various examples, the flexible antenna belt 300 may include a second side 303 that is in contact with the first side 301. In some examples, the flexible antenna belt 300 may be comprised of a non-impact antenna radiation flexible material. In some examples, the flexible antenna belt 300 may be a sheet comprised of non-impact antenna radiation flexible material. As used herein, the term "sheet" refers to a flexible antenna belt that does not connect the flexible antenna belt in a continuous loop.

In various examples, the flexible antenna belt 300 may include a flexible display 308. In some examples, the flexible display 308 may be coupled to either of the first side 301 of the flexible antenna belt 300 or the second side 303 of the flexible antenna belt 300.

In various examples, the flexible antenna belt 300 may include an antenna slot 302. In various examples, the antenna slot 302 may be an opening extending through the flexible antenna belt 300. In some examples, the antenna slot 302 may be an opening on the first side 301 of the flexible antenna belt 300 or the second side 303 of the flexible antenna belt 300 that is adjacent the flexible antenna display. In some examples, the antenna slot 302 may be an opening that encompasses 10% to 95% of the first side 301 of the flexible antenna belt 300 or the second side 303 of the flexible antenna belt 300. However, the disclosure is not so limited. For example, the antenna slot 302 may be an opening that encompasses a portion of the first side 301 or a portion of the second side 303 enough to allow wireless signals and antenna radiation to pass through. Further, in some examples, the flexible antenna belt 300 may be slot-free (i.e., may not include an antenna slot).

Figure 4:
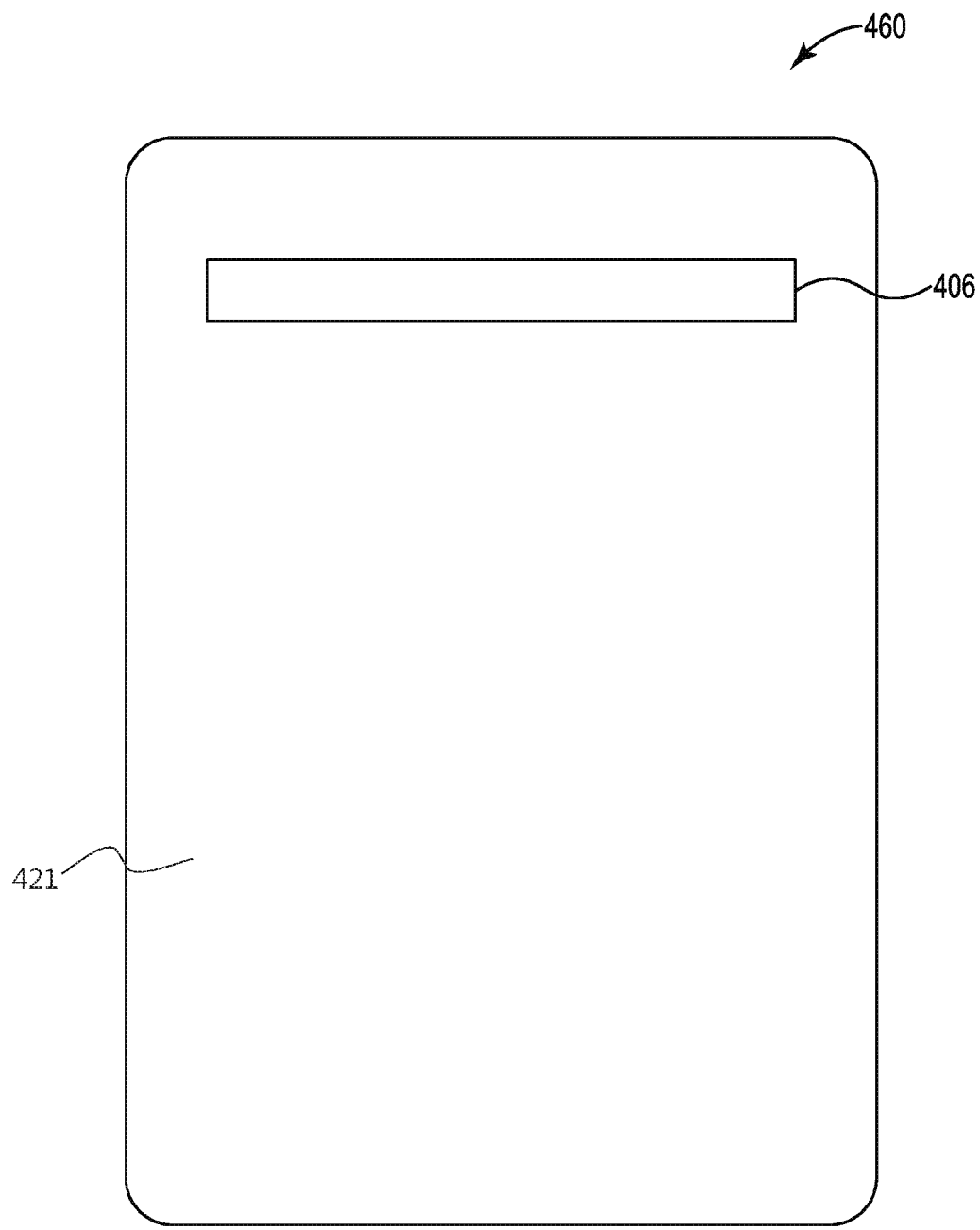
FIG. 4 illustrates an example of a computing device with a flexible antenna belt according to the disclosure.

As illustrated in FIG. 3, the flexible antenna belt 300 may include two rollers 304. In some examples, the flexible antenna belt 300 may be wrapped around the rollers 304. In some examples, the rollers 304 may rotate the flexible antenna belt 300 in a direction, along the axis, as denoted by the arrow 333, FIG. 4 illustrates an example of a computing device 460 with a flexible antenna belt according to the disclosure. In some examples, the computing device 460 may have two sides, a front side (see, e.g., 923 of FIG. 9) and a back side 421. In some examples, the computing device 460 may include a transparent antenna cover 406. In some examples, the transparent antenna cover 406 may be on the back side 421 of the computing device 460.

In some examples, the transparent antenna cover 406 may be comprised of transparent material. In some examples, the transparent antenna cover 406 may be comprised of glass. In some examples, the transparent antenna cover 406 may be comprised of optical plastics. In some examples, optical plastics may include polyacrylic (PMMA), polycarbonate, cyclic olefin copolymer (COO), or combinations thereof.

In some examples, the transparent antenna cover 406 may extend across a portion of the back side 421 of the computing device 460. In some examples, the transparent antenna cover 406 may extend across the entire back side 421 of the computing device 460. However, the disclosure is not so limited. In some examples, the transparent antenna cover 406 may extend across the back side 421 of the computing device 460 enough to allow wireless signals and antenna radiation to pass through.

In some examples, the transparent antenna cover 406 may be located at any portions of the back side 421 of the computing device 460. In some examples, the transparent antenna cover 406 may be located at the end portions of the back side 421 of the computing device 460. As used herein, the term "end portion" in reference to the computing device refers to an end within twenty-five percent of the ends closest to the front side opposite the back side.

In some examples, the computing device 460 may include a flexible antenna belt (see, e.g., 100 of FIG. 1), consistent with this disclosure, disposed inside of the computing device 460. In some examples, the flexible antenna belt is to transition responsive to receipt of a wireless signal by the computing device.

Figure 5:
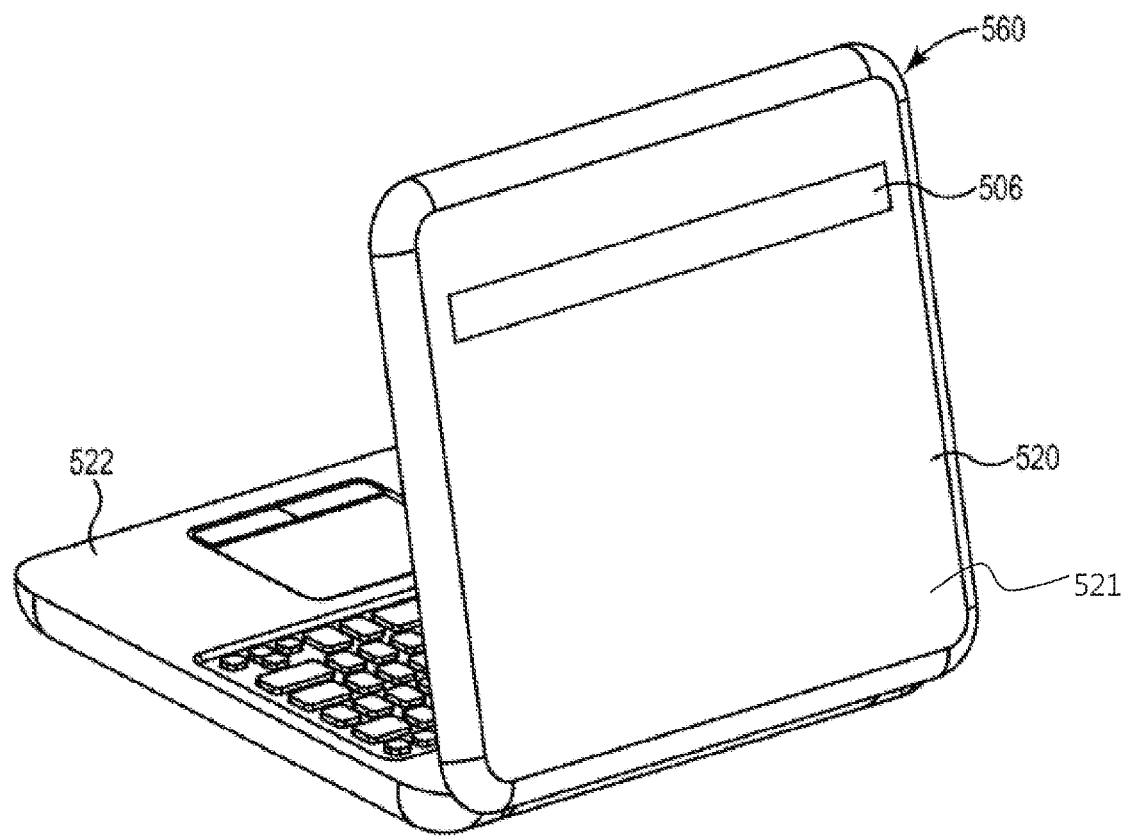
FIG. 5 illustrates an example of a computing device with a flexible antenna belt according to the disclosure.

FIG. 5 illustrates an example of a computing device 560 with a flexible antenna belt according to the disclosure. In some examples, the computing device 560 may include a display member 520 and a base member 522. In some examples, the display member 520 may have two sides, a front side (see, e.g., 923 of FIG. 9) and a back side 521. In some examples, the computing device 560 may include a transparent antenna cover 506 located on the back side 521 of the display member 520. In some examples, the transparent antenna cover 506 may be on the back side 521 of the display member 520. In some examples, the transparent antenna cover 506 may be comprised of transparent material. In some examples, the transparent antenna cover 506 may be comprised of glass. In some examples, the transparent antenna cover 506 may be comprised of optical plastics.

In some examples, the transparent antenna cover 506 may extend across a portion of the back side 521 of the display member 520. In some examples, the transparent antenna cover 506 may extend across the entire back side 521 of the display member 520. However, the disclosure is not so limited. In some examples, the transparent antenna cover 506 may extend across the back side 521 of the display member 520 enough to allow wireless signals and antenna radiation to pass through.

In some examples, the transparent antenna cover 506 may be located at any portions of the back side 521 of the display member 520. In some examples, the transparent antenna cover 506 may be located at the end portions of the back side 521 of the display member 520.

Figure 6:
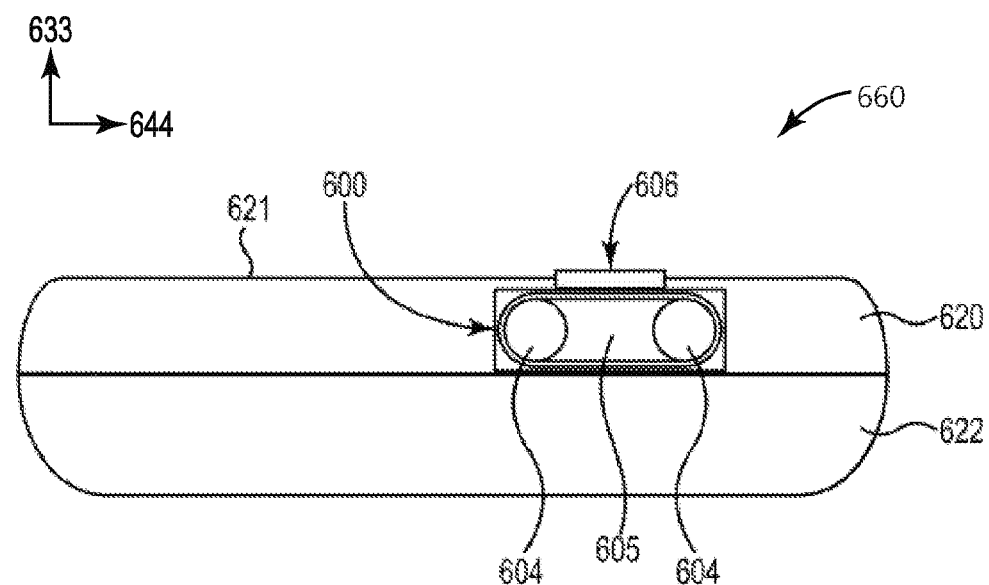
FIG. 6 illustrates an example of a computing device with a flexible antenna belt according to the disclosure.

In some examples, the display member 520 of computing device 560 may include a flexible antenna belt (see, e.g., 600 of FIG. 6), consistent with this disclosure, disposed inside of the display member 520. In some examples, the flexible antenna belt, as described herein, may be adjacent to the transparent antenna cover 506, FIG. 6 illustrates an example of a computing device 660 with a flexible antenna belt 600 according to the disclosure. In some examples, the computing device 660 may include a display member 620 and a base member 622. In some examples, the display member 620 may have two sides, a front side (see, e.g., 923 of FIG. 9) and a back side 621. In some examples, the computing device 660 may include a transparent antenna cover 606. In some examples, the transparent antenna cover 606 may be on the back side 621 of the display member 620. In some examples, the transparent antenna cover 606 may be comprised of transparent material. In some examples, the transparent antenna cover 606 may be comprised of glass. In some examples, the transparent antenna cover 606 may be comprised of optical plastics.

In some examples, the transparent antenna cover 606 may extend across a portion of the back side 621 of the display member 620. In some examples, the transparent antenna cover 606 may be located at any portions of the back side 621 of the display member 620. In some examples, the transparent antenna cover 606 may be located at the end portions of the back side 621 of the display member 620.

In some examples, the display member 620 of computing device 660 may include a flexible antenna belt 600 disposed inside of the display member 620. In some examples, the flexible antenna belt 600 may include an antenna slot (see, e.g., 102 of FIG. 1). In some examples, the flexible antenna belt 600 may include a flexible display (see, e.g., 108 of FIG. 1). In various examples, the flexible antenna belt 600 may transition between an open position and a closed position. In some examples, the flexible antenna belt 600 may allow wireless signals and antenna radiation to pass through when the flexible antenna belt 600 is in an open position. In some examples, the flexible antenna belt 600 may stop wireless signals and antenna radiation to pass through when the flexible antenna belt 600 is in a closed position. In some examples, the flexible antenna belt 600 may be in an open position when the flexible display (see, e.g., 108 of FIG. 1) is not aligned with the transparent antenna cover 606. In some examples, the flexible antenna belt 600 may be in an open position when the antenna slot (see, e.g., 102 of FIG. 1) is aligned with the transparent antenna cover 606. In some examples, the flexible antenna belt 600 may be in a closed position when the flexible display (see, e.g., 108 of FIG. 1) is aligned with the transparent antenna cover 606. In some examples, the flexible display (see, e.g., 108 of FIG. 1) may have the same dimensions as the transparent antenna cover 606. In some examples, the antenna slot (see, e.g., 102 of FIG. 1) may have the same dimensions as the transparent antenna cover 606.

As illustrated in FIG. 6, the flexible antenna belt 600 may form a continuous loop 605. In some examples, the flexible antenna belt 600 may include two rollers 604. In some examples, the rollers 604 may be disposed inside the continuous loop 605 of the flexible antenna belt 600. In some examples, the rollers 604 may rotate the flexible antenna belt 600 in a direction, along the axis, as denoted by the arrow 644. However, the disclosure is not so limited. The computing device 660 may include any flexible antenna belt consistent with the disclosure. For example, flexible antenna belt 600 may be a looped flexible antenna belt that rotates in a direction, along the axis, as denoted by the arrow 633 to allow wireless signals and antenna radiation to pass through or to block wireless signals and antenna radiation or flexible antenna belt 600 may be a sheet that transitions in a direction, along the axis, as denoted by the arrow 644 direction to allow wireless signals and antenna radiation to pass through or to block wireless signals and antenna radiation.

Figure 7:
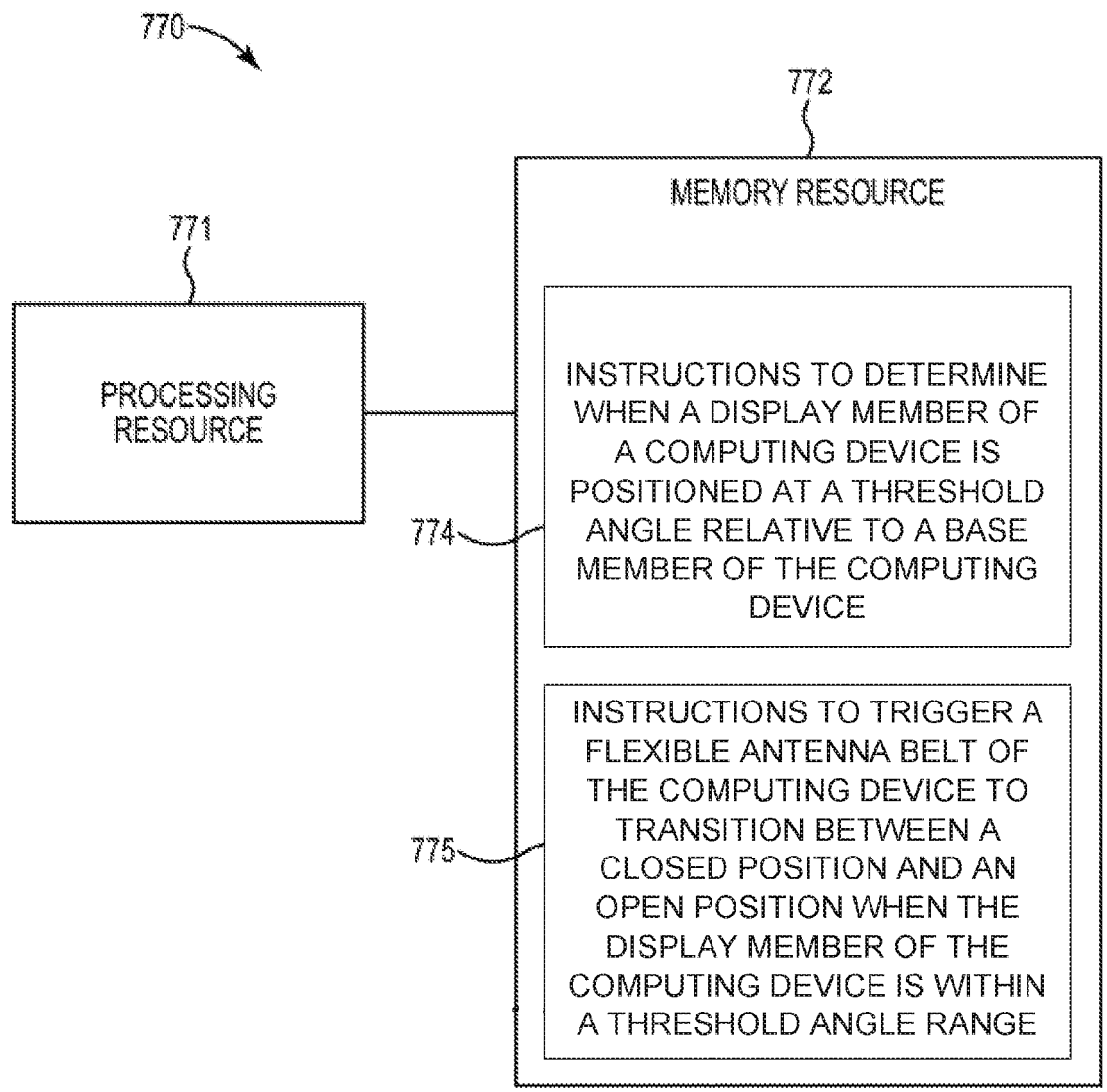
FIG. 7 illustrates a diagram of a method for transitioning a flexible antenna belt according to the disclosure.

FIG. 7 illustrates a diagram of a method 770 for transitioning a flexible antenna belt according to the disclosure. As illustrated in FIG. 7, the apparatus 770 includes a processing resource 771 and a memory resource 772. The processing resource 771 may be a hardware processing unit such as a microprocessor, application specific instruction set processor, coprocessor, network processor, or similar hardware circuitry that may cause machine-readable instructions to be executed. In some examples, the processing resource 771 may be a plurality of hardware processing units that may cause machine-readable instructions to be executed. The processing resource 771 may include central processing units (CPUs) among other types of processing units. The memory resource 772 may be any type of volatile or non-volatile memory or storage, such as random access memory (RAM), flash memory, read-only memory (ROM), storage volumes, a hard disk, or a combination thereof.

The memory resource 772 may store instructions thereon, such as instructions 774 and 775. When executed by the processing resource 771, the instructions 773 may cause the apparatus 770 to perform specific tasks and/or functions. For example, the memory resource 772 may store instructions 774 which may be executed by the processing resource 771 to cause the apparatus 770 to determine when a display member of a computing device is positioned at an angle relative to a base member of the computing device that is within a threshold angle range. The memory resource 772 may store instructions 775 which may be executed by the processing resource 771 to cause the apparatus 770 to trigger a flexible antenna belt of the computing device to transition between a closed position and an open position when the display member of the computing device is within the threshold angle range.

Figure 8:
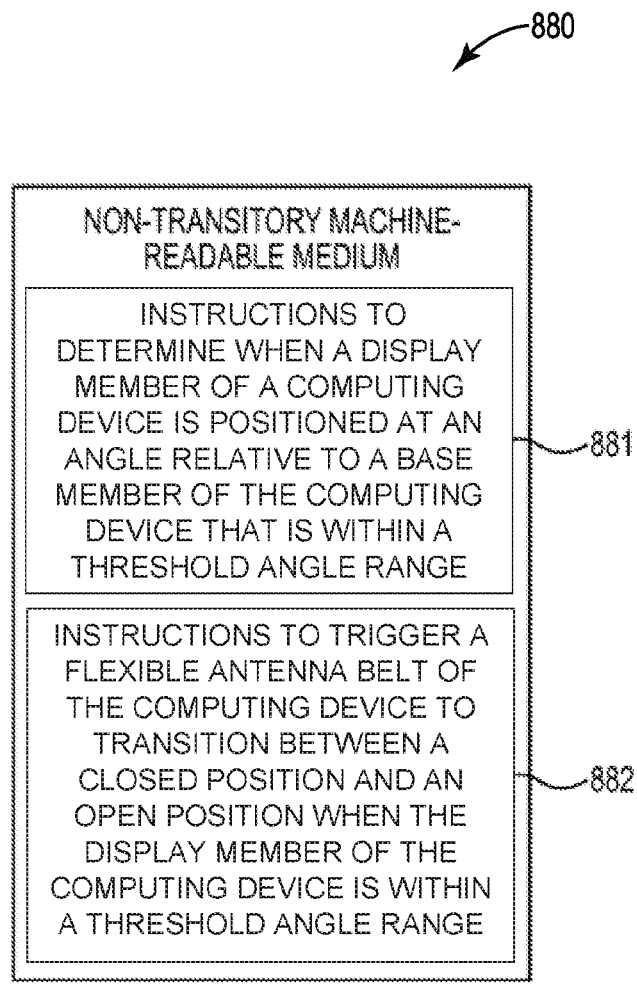
FIG. 8 illustrates a diagram of a method for transitioning a flexible antenna belt according to the disclosure.

FIG. 8 illustrates a diagram of a method 880 for transitioning a flexible antenna belt according to the disclosure. A processing resource may execute instructions stored on the non-transitory machine readable medium 880. The non-transitory machine readable medium 880 may be any type of volatile or non-volatile memory or storage, such as random access memory (RAM), flash memory, read-only memory (ROM), storage volumes, a hard disk, or a combination thereof.

The medium 880 stores instructions 881 executable by a processing resource to determine when a display member of a computing device is positioned at an angle relative to a base member of the computing device that is within a threshold angle range. The medium 880 stores instructions 882 executable by a processing resource to trigger a flexible antenna belt of the computing device to transition between a closed position and an open position when the display member of the computing device is within the threshold angle range.

Figure 9:
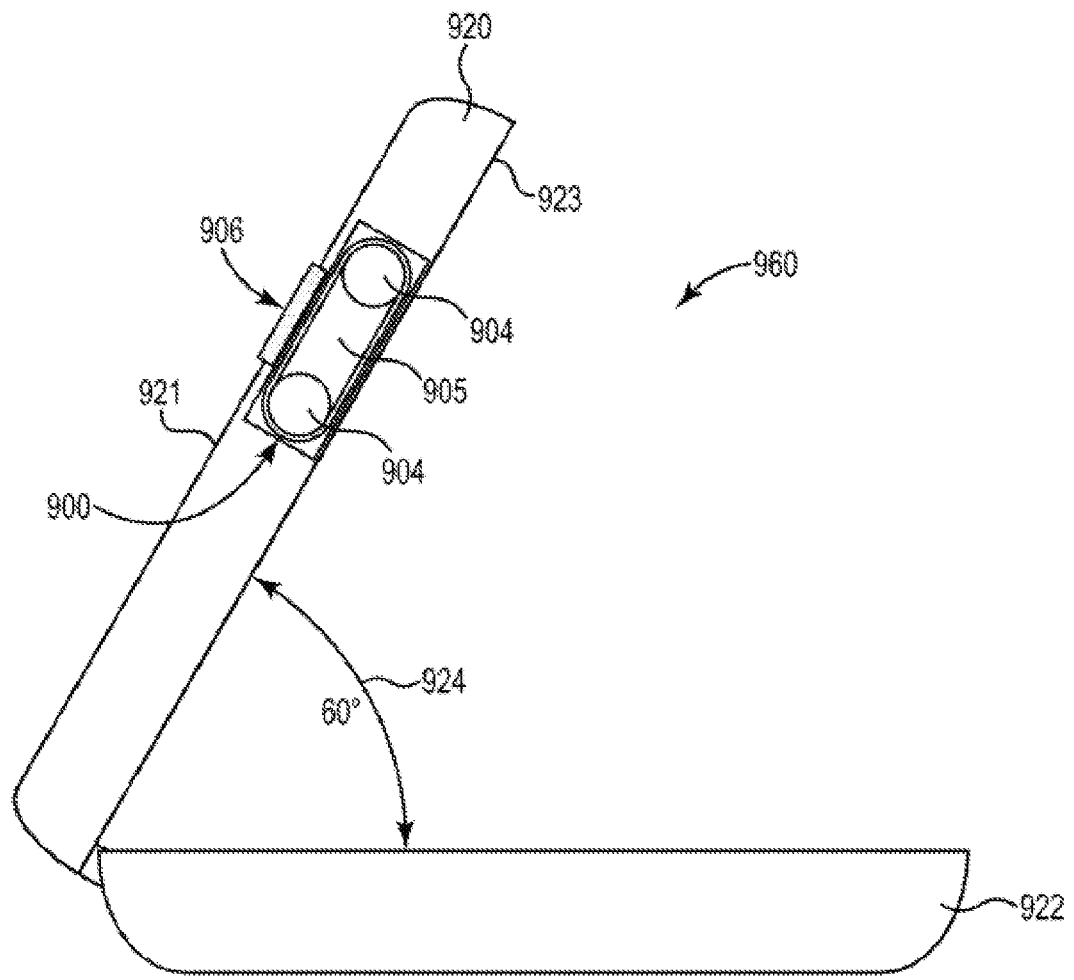
FIG. 9 illustrates an example of a computing device with a flexible antenna belt according to the disclosure.

FIG. 9 illustrates an example of a computing device 960 with a flexible antenna belt 900 according to the disclosure. In some examples, the computing device 960 may include a display member 920 and a base member 922. In some examples, the display member 920 may have two sides, a front side 923 and a back side 921. In some examples, the computing device 960 may include a transparent antenna cover 906. In some examples, the transparent antenna cover 906 may be on the back side 921 of the display member 920. In some examples, the transparent antenna cover 906 may be comprised of transparent material. In some examples, the transparent antenna cover 906 may be comprised of glass. In some examples, the transparent antenna cover 906 may be comprised of optical plastics.

In some examples, the display member 920 of computing device 960 may include a flexible antenna belt 900 disposed inside of the display member 920. In some examples, the flexible antenna belt 900 may transition to an open position upon receipt of a signal. In some examples, the flexible antenna belt 900 may transitions to a closed position when no signal is received. In some examples, the flexible antenna belt 900 may transition to a closed position when the display member 920 of the computing device 960 is positioned at an angle less than 60 degrees 924 relative to the display member 920 of the computing device 960. Similarly, the flexible antenna belt 900 may rotate to a closed position when the display member 920 of the computing device 960 is positioned at an angle less than 60 degrees 924 relative to the display member 920 of the computing device 960.

In some examples, the flexible antenna belt 900 may transition to an open position when the display member 920 of the computing device 960 is positioned at an angle greater than or equal to 60 degrees 924 relative to the display member 920 of the computing device 960. Similarly, the flexible antenna belt 900 may rotate to an open position when the display member 920 of the computing device 960 is positioned at an angle greater than or equal to 60 degrees 924 relative to the display member 920 of the computing device 960.

In some examples, when the flexible antenna belt 900 transitions into an open position, the flexible display (see, e.g., 108 of FIG. 1) may move out of alignment with the transparent antenna cover 906 to allow wireless signals and antenna radiation to pass through allowing the computing device 960 to receive such signals. In some examples, when the flexible antenna belt 900 transitions into a closed position, the flexible display (see, e.g., 108 of FIG. 1) may align with the transparent antenna cover 906 stopping wireless signals and antenna radiation from passing through.

In some examples, when the flexible antenna belt 900 rotates into an open position, the flexible display (see, e.g., 108 of FIG. 1) may move out of alignment with the transparent antenna cover 906 to allow wireless signals and antenna radiation to pass through allowing the computing device 960 to receive such signals. In some examples, when the flexible antenna belt 900 rotates into a closed position, the flexible display (see, e.g., 108 of FIG. 1) may align with the transparent antenna cover 906 stopping wireless signals and antenna radiation from passing through.

As illustrated in FIG. 9, the flexible antenna belt 900 may form a continuous loop 905. In some examples, the flexible antenna belt 900 may include two rollers 904. In some examples, the rollers 904 may be disposed inside the continuous loop 905 of the flexible antenna belt 900.

Figure 10:
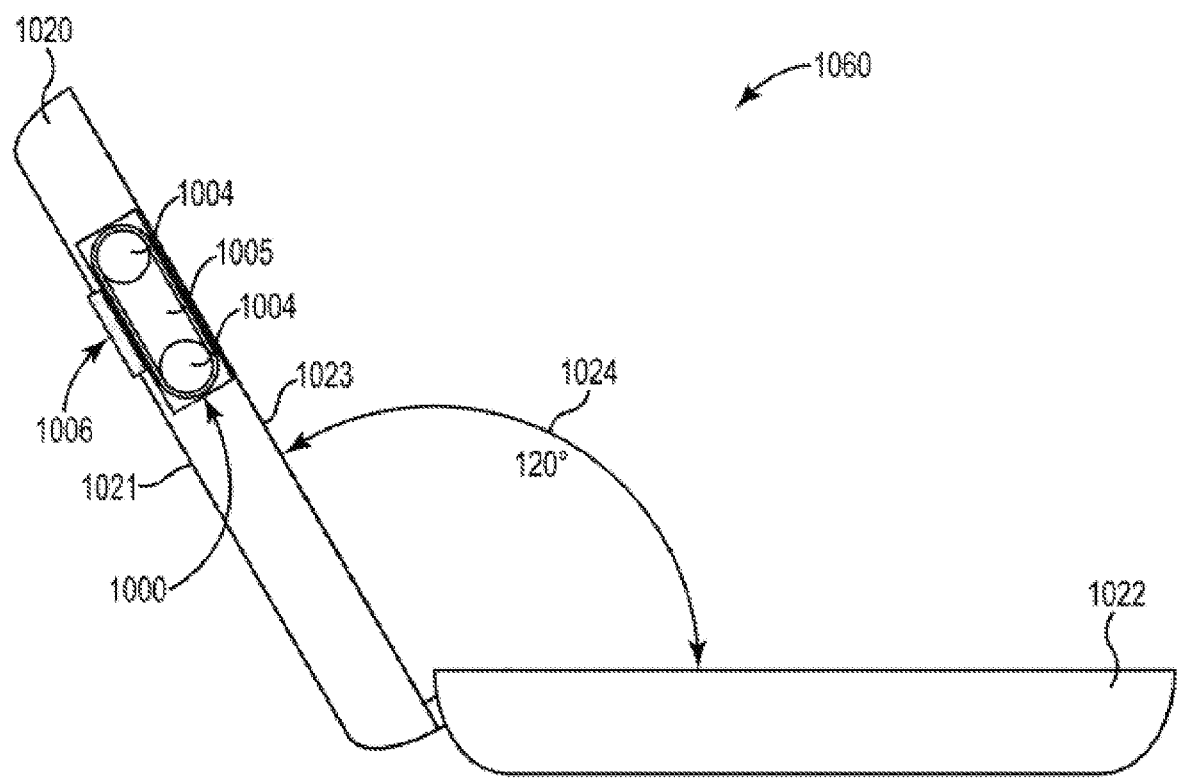
FIG. 10 illustrates an example of a computing device with a flexible antenna belt according to the disclosure.

FIG. 10 illustrates an example of a computing device 1060 with a flexible antenna belt 1000 according to the disclosure. In some examples, the computing device 1060 may include a display member 1020 and a base member 1022. In some examples, the display member 1020 may have two sides, a front side 1023 and a back side 1021. In some examples, the computing device 1060 may include a transparent antenna cover 1006. In some examples, the transparent antenna cover 1006 may be on the back side 1021 of the display member 1020.

In some examples, the display member 1020 of computing device 1060 may include a flexible antenna belt 1000 disposed inside of the display member 1020. In some examples, the flexible antenna belt 1000 may include two rollers 1004 disposed inside the continuous loop 1005.

In some examples, the opening may allow the flexible antenna belt 1000 to transition between an open position and a close position. In some examples, the flexible antenna belt 1000 may transition to an open position upon receipt of a signal. In some examples, the flexible antenna belt 1000 may transitions to a closed position when no signal is received.

In some examples, the flexible antenna belt 1000 may transition to a closed position when the display member 1020 of the computing device 1060 is positioned at an angle greater than 120 degrees 1024 relative to the display member 1020 of the computing device 1060. Similarly, the flexible antenna belt 1000 may rotate to a closed position when the display member 1020 of the computing device 1060 is positioned at an angle greater than 120 degrees 1024 relative to the display member 1020 of the computing device 1060.

In some examples, the flexible antenna belt 1000 may transition to an open position when the display member 1020 of the computing device 1060 is positioned at an angle equal to or less than 120 degrees 1024 relative to the display member 1020 of the computing device 1060. In some examples, the flexible antenna belt 1000 may rotate to an open position when the display member 1020 of the computing device 1060 is positioned at an angle equal to or less than 120 degrees 1024 relative to the display member 1020 of the computing device 1060.

It should be understood that when an element is referred to as being "on," "in contact," "connected to", "coupled to", or "coupled with" another element, it may be directly on, in contact, connected, or coupled with the other element or intervening elements may be present. In contrast, when an object is "directly coupled to" or "directly coupled with" another element it is understood that are no intervening elements (adhesives, screws, other elements) etc.

It should be understood that when an element is referred to as being "adjacent" to another element, it may be on, in contact, connected, next to, or coupled with the other element.

It should be understood that the descriptions of various examples may not be drawn to scale and thus, the descriptions may have a different size and/or configuration other than as shown therein.

While some elements are designated as a "top" or a "bottom" and/or "front" or "back," it should be understood that such elements may correspond to other relative terms or possible orientations in some applications in order to practice the examples of this disclosure.

What is claimed:

1. A system comprising:
    a flexible antenna belt forming a continuous loop to allow the flexible antenna belt to transition between a closed position and an open position; and
    a flexible display coupled to the flexible antenna belt.

2. The system of claim 1, wherein the flexible display is comprised of an organic light emitting diode (OLED), electrophoretic display (EPD), liquid crystal display (LCD), organic LCD, cholesteric LCD, micro-electro-mechanical systems (MEMS), or combinations thereof.

3. The system of claim 1, wherein the flexible antenna belt is to rotate between the closed position and the open position.

4. The system of claim 1, wherein the flexible antenna belt is comprised of a non-impact antenna radiation flexible material, wherein the non-impact antenna radiation flexible material comprises a polytetrafluoroethylene (PTFE) coated aramid synthetic fiber.

5. A computing device comprising:
    a base member; and
    a display member, the display member comprising,
        a transparent antenna cover;
        a flexible antenna belt forming a continuous loop to allow the flexible antenna belt to rotate between a closed position and an open position; and
        a flexible display coupled to the flexible antenna belt.

6. The computing device of claim 5, wherein the flexible antenna belt is to rotate responsive to receipt of a wireless signal by the computing device.

7. The computing device of claim 5, wherein an antenna slot is on a first side of the flexible antenna belt and wherein the flexible display is on a second side of the flexible antenna belt.

8. The computing device of claim 5, wherein the flexible antenna belt is disposed in the display member adjacent to the transparent antenna cover.

9. The computing device of claim 5, wherein the transparent antenna cover is comprised of glass or optical plastics, wherein the optical plastic further comprises polyacrylic (PMMA), polycarbonate, cyclic olefin copolymer (COC), or combinations thereof.

10. The computing device of claim 5, wherein the transparent antenna cover is on a back side of the display member.

11. The computing device of claim 10, wherein the transparent antenna cover is located at an end portion of the display member.

12. A non-transitory machine-readable medium storing instructions executable by a processing resource of a computing device to:

determine when a display member of the computing device is positioned at an angle relative to a base member of the computing device that is within a threshold angle range; and trigger a flexible antenna belt, in a form of a continuous loop, of the computing device to transition between a closed position and an open position when the display member of the computing device is within the threshold angle range.

13. The medium of claim 12, wherein the flexible antenna belt is to rotate between the closed position and the open position, wherein the flexible antenna belt is to rotate about rollers in contact with the flexible antenna belt.

14. The medium of claim 12, wherein the flexible antenna belt is a sheet that is to transition between the open position and the closed position, wherein the sheet is to transition about rollers in contact with the sheet.

15. The medium of claim 12, wherein the threshold angle range comprises a range of from about 60 degrees to about 140 degrees.

* * * * *